Jan. 5, 1971   H. KORTHAUS ET AL   3,553,557

ELECTRIC MOTOR WITH OVERLOAD CUT-OUT

Filed June 18, 1968   2 Sheets-Sheet 1

INVENTORS
Helmut Korthaus
Richard Wilke
By Ernest F. Montague
attorney

United States Patent Office 3,553,557
Patented Jan. 5, 1971

3,553,557
ELECTRIC MOTOR WITH OVERLOAD CUT-OUT
Helmut Korthaus, Fernblick 3, Wuppertal-Barmen, Germany, and Richard Wilke, Schwelmestrasse 51, Schwelm, Germany
Filed June 18, 1968, Ser. No. 738,058
Claims priority, application Germany, Oct. 5, 1967, 1,588,376
Int. Cl. H02h 7/085
U.S. Cl. 318—463    10 Claims

ABSTRACT OF THE DISCLOSURE

An electric motor with pre-selectable number of revolutions and switchable in two directions of rotation, which comprises a stator including a stator-winding, a motor shaft, a rotor formed as a slider and mounted on the motor shaft, as well as including an overload cut-out means, and a motor housing receiving the stator and the rotor. The overload cut-out means comprises an overload coupling operatively connected with the rotor and the motor shaft, respectively, so that the overload coupling transmits the motor torque from the rotor to the motor shaft. The motor shaft comprises two shafts disposed coaxially relative to each other and one of said two shafts is hollow and receives the other of the two shafts, to constitute the output shaft and carrying the rotor. The hollow one of said shafts and the other of said shafts are formed for a part of their length as a threaded spindle and a threaded spindle nut, respectively, engaging each other. The overload coupling comprises a disk-shaped body sitting rigidly on the hollow one of the shafts and has about its periphery a plurality of equally divided axial bores.

---

The present invention relates to an electric motor with overload cut-out, in general, and to an electric motor switchable in two directions with pre-selectable number of revolutions, having an overload coupling provided inside of the motor housing, settable in relation to the output torque, in particular, whereby a hollow rotor shaft, as well as the motor output shaft are formed for a part of their length as a spindle and a spindle nut, respectively, and whereby the hollow shaft is axially displaceable by rotation on the axially immovable motor output shaft for operation of the coupling.

Since in the electric motor of the device disclosed in applicants' own U.S. Pat. No. 3,165,656 (dated Jan. 12, 1965), the cut-out takes place only after the timely response time of the overload coupling with an overload cut-out formed as a free-wheel drive, and not simultaneously with the response of the overload coupling, in this arrangement a retardation thus results, which is caused by the mechanical response time of the overload coupling, on the one hand, and by the electro-mechanical response time of the switch contacts, on the other hand, which, due to the necessary pretension for the contact pressure open and close, respectively, only after overcoming this pretension.

It is one object of the present invention to provide an electric motor with overload cut-out, wherein, on the one hand, a replacement of the free wheel drive overload coupling arrangement by an appreciably structural arrangement is brought about, and, on the other hand, the shortening of these response times to a minimum given only by the electric switch circuits is obtained.

It is another object of the present invention to provide an electric motor with overload cut-out wherein a simpler setting and control possibility of the output torque of the motor is arranged.

It is yet another object of the present invention to provide an electric motor with overload cut-out, wherein the reduction of the fly-wheel mass is connected, in accordance with said prior patent, on the one hand, with the rotor, and on the other hand, with the axially immovable motor shaft, whereby it is apparent, that the reduction of these fly-wheel masses brings about particular care of the mechanical devices operated by the motor.

While in the structure of the prior patent, by corresponding selection of pressure springs and of their pretension, the possibility exists to influence the output torque of the motor, this possible influencing assumes in each case a demounting of the motor, either in order to exchange the springs, or to vary their pretension, a control without mechanical invention, as it is provided now in accordance with the present invention, bring about an important simplification and improvement of the motor structure.

It is also another object of the present invention to provide an electric motor with overload cut-out, wherein the overload coupling comprises a disc-shaped body sitting rigidly on the hollow rotor shaft, and which has at its periphery equally distributed axial perforations, for instance bores, and is disposed within a cylindrical hollow housing, which is secured, on the one hand, by means of pressure bearings axially immovable on the likewise axially immovable motor shaft, and is supported on the other hand, by means of needle or slide bearings on the hollow rotor shaft, whereby continuous bolts, passing through the equally distributed bores of the disc supported on both sides by means of buffer springs, hold together the housing with the complementary closing cover, and wherein furthermore a disc, preferably of light metal or synthetic material, is axially safely mounted on the motor shaft, which disc carries on its periphery a waved sheet metal ring, whereby at a small distance radially in front of the latter a pole shoe, carrying an induction coil, is provided, which pole shoe sits on a permanent magnet, magnetized in the longitudinal direction, and the magnet is rigidly disposed in the motor housing with the pole shoe and the coil on securing angles settable by means of screws and slots.

The connection of the hollow rotor shaft with the rigid output motor shaft takes place now over smaller fly-wheel masses, in which the body which is rotationally symmetrical connecting these two parts has been simplified, and thereby simultaneously the operational safety is increased.

It is a further object of the present invention to provide an electric motor with overload cut-out, wherein the separation of the electrical cut-out device from the previously mechanical operation, which is performed by the elastic connection between the motor and rotor shaft, is brought about. The cut-out timing, after passing of the predetermined and pre-settable torque, is determined now directly by the number of revolutions of the rigid motor shaft. Simultaneously, however, independently from this cut-out timing, the elastic displacement of the rotor with its hollow rotor shaft takes place on the axially immovable output shaft. Since the output shaft, due to the surpassing of the torque, has assumed a lower number of revolutions, and by the simultaneous cut-out of the motor, no driving torque is obtained any more, the fly-wheel mass for the driven part is ineffective, since it is caught elastically by the movement of the rotor with its hollow shaft on the axially immovable motor shaft.

Since now the mechanical connection between the electric cut-out circuit and the axial movement of the rotor including its hollow shaft is no longer present, for the desired setting of the output torque the response sensitivity of the electric cut-out circuit is now only determinable, which, in accordance with the operational requirements, is provided directly in or on the motor housing, for instance, in a connecting box. The spring forces which are variable in accordance with the prior patent for this torque limitation, can now be non-variably constant, and can be adjusted to the maximum torque generally to be set for each motor.

With these and other objects in view which will become apparent in the following detailed description, the present invention will be fully understood in connection with the accompanying drawings, in which.

Figure 1:
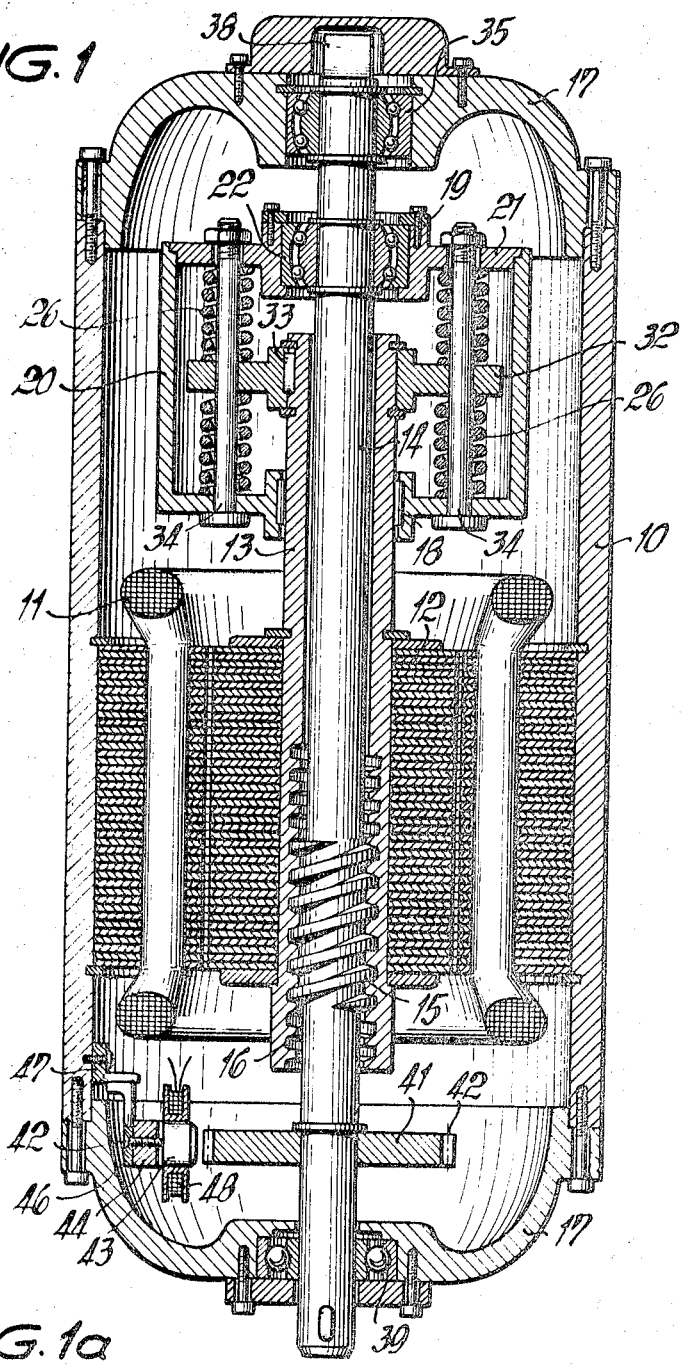
FIG. 1 is an axial section of the electric motor.

Referring now to the drawings, and in particular to FIG. 1, the electric motor comprises a motor housing 10 which receives a stator winding, namely the so-called stator 11 of a 3-phase electric motor. The rotor 12 formed as a runner is pressed on a motor drive, in particular on a hollow shaft 13, which receives inside the actual motor output shaft 14. Both shafts 13 and 14 are telescoped into each other and are formed over a part of their length as a spindle 15 and a spindle nut 16, whereby the hollow shaft 13 constitutes the spindle nut 16, and the inside disposed motor output shaft 14 constitutes the spindle 15. The motor output shaft 14, in turn, is mounted non-displaceably in both bearing covers 17 of the motor housing 10 by means of bearings 35 and 39. In order to avoid, that, during start of the rotor 12, the latter displaces itself on the motor output shaft 14 over the spindle thread 15 and 16, a coupling arrangement is provided between these two parts within the motor housing 10, which is described more closely below.

A disc 32, made preferably of steel, is axially and radially safely secured on the hollow rotor shaft 13, and equipped with bores equally divided over its periphery by means of spring rings and groove and key 33. Prior to the mounting of this disc 32 a hollow body 20 rotationally symmetric having a needle bearing 18 is mounted on the rotor shaft 13. Bolts 34 equipped with buffer springs 26 project through the bores of the disc 32 and hold by means of end threads and nuts a cover disc 21, which, in turn, is axially non-displaceably connected by means of a pressure bearing 22 with the motor output shaft 14. A round closing disc 19 secures the pressure bearing 22 in the closing cover 21, while the inner part of the bearing 22 is retained on the shaft 14 by means of spring rings. This coupling arrangement jointly with the spindle thread 15 and 16 results in an axially resilient mounting of the rotor 12.

If the output shaft 14, put to rotation by the switched-on motor, is overloaded or even locked, then the rotor 12 travels jointly with the rotor hollow shaft 13 axially in opposite rotary direction, and is elastically caught by the buffer springs 26. If it is possible to switch off the motor without time delay during this overloading or locking, then, at the same moment, also the torque driving the rotor disappears and the fly-wheel mass of the rotor, jointly with its hollow shaft, consumes the greater part of its energy by the axial movement of the rotor driving shaft 14 without becoming effective to the outside. This process is equally effective in both possible rotary directions of the motor.

The simple device described below serves for the realization of the fastest possible cut-out of the motor, during an undesirable loading or locking of the output shaft. A disk 41 rotationally symmetric is non-displaceably retained, preferably of aluminum or synthetic material by means of spring rings for the purpose of reducing the fly-wheel mass, whereby the seat of the disc 41 is chosen on the drive shaft 14 such, the the disk 41 is subjected to rotation due to the rotation of the shaft 14. If necessary, one of the known safety measures, namely a groove and key (not shown), can be used.

Figure 1A:
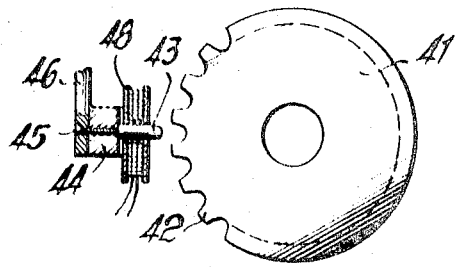
FIG. 1a is a fragmentary top plan view of the self-induction device.

This round disk 41 carries at its outer periphery a thin waved ring 42 closed in itself and made of soft sheet metal, which ring 42 adheres either by its own tension immovably on this disk 41, or can be glued thereto additionally. The disk 41 can possibly also be equipped with corresponding recesses, into which the waved sheet metal ring is inserted. This disk 41, which to a certain extent can be considered as a substitute for a toothed gear, passes at a small distance from a soft iron pole shoe 43. The pole shoe 43 sits, in turn, on a permanent magnet 44 and carries simultaneously of coil 48. The pole shoe 43 and the permanent magnet 44 are screwed together by means of securing screws 45 (FIG. 1a) with an angular member 46, which, in turn, is adjustably connected with a counter member 47, which is non-displaceably and rigidly connected with the housing. The angular member 47 has a slot, in order to adjust the distance between the pole shoe 43 and the disk 41. The coil 48 sitting on the pole shoe 43 is similar to the hearing coils used previously on telephone receivers, and has, for instance, an ohmic resistance of 2,000 ohms.

The passing waved sheet metal strip or ring 42, passing the pole shoe 43 during rotation causes a variation of the magnetic flow and induces thereby in the coil 48 an alternating voltage, the frequency of which depends upon the number of the teeth and the number of revolutions. During the constant distance between the pole shoe 43 and the waved iron sheet metal strip 42, and in case of a constant number of teeth, a constant alternating voltage results, if the number of revolutions is constant. If the number of revolutions changes, then also the alternating voltage changes simultaneously, as well as the frequency of this voltage, and in particular in the same sense as the number of revolutions changes. This extremely simple arrangement has, in addition, spacially appreciably smaller dimensions than the previously normally used magnet heads, which have both poles separated by an air slit and which interrupt and close this air split by iron sheet metal teeth. It is apparent, that with this simple device, since it is spacially very small, easily by correspondingly many waves of the iron sheet, quite high frequencies can be produced. Still greater and more apparent is this advantage in relation to the devices, which permit the rotation of the permanent magnets in front of a spool, and thus produce the impulses, since permanent magnets, even if they are very small, require more space and are more expensive than this simple, waved embodiment consisting of a thin iron sheet of a thickness of about one half of a millimeter.

Figure 2:
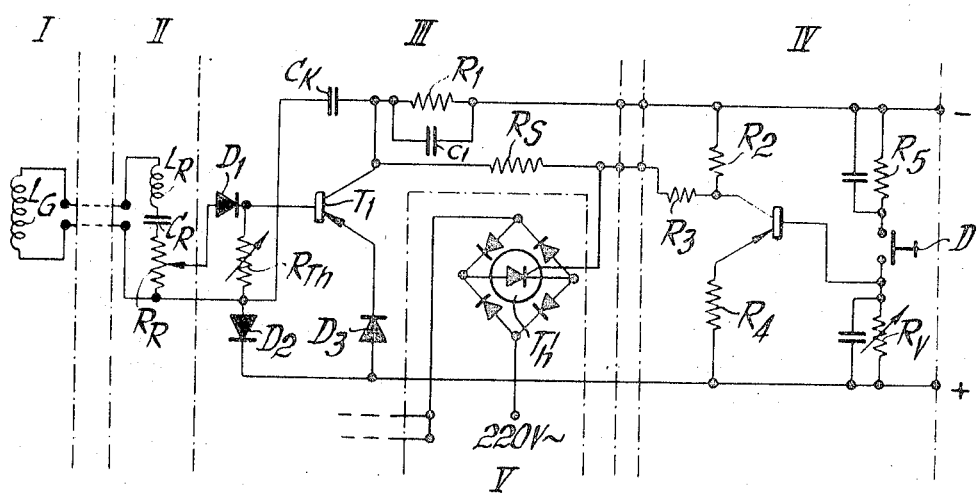
FIG. 2 is an electric circuit diagram for the electric cut-out device disclosed in FIG. 1.
Figure 3:
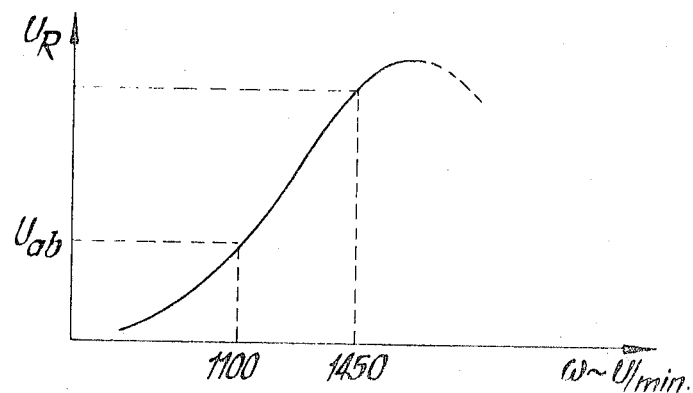
FIG. 3 is a diagrammatic showing, depicting the resonance curve.

The operation of the cut-out device, in accordance with the present invention, is clearly apparent from FIGS. 2 and 3 of the drawings.

In FIG. 2, the generator LG is disposed in a field I. The terminals of the coil, thus of the generator, are connected by means of, for example, a thin rubber cable, with the input terminals of a circuit II. The circuit II comprises a simple series resonance circuit with a resistance complementary thereto and formed of the parts $L_R$, $C_R$ and $R_R$. This resonance circuit II is, as shown in FIG. 3, dimensioned such, that at the nominal speed of the motor, for instance 1500 r./min., the resonance peak of the circuit is reached. If the motor speed falls, the generator frequency likewise falls, and thereby the resonance voltage falls along the resonance curve. The reduction of the resonance voltage is, furthermore, made still more steep by the simultaneously reducing voltage from the generator LG.

Since the useful tension falling at the useful resistance $R_R$ of the resonance circuit is too small for the direct operation of the motor relay, this voltage is amplified in a simple transistor amplifier, as it is shown in circuit III, and fed through a rectifier bridge circuit to an electronic switch, namely a thyristor $T_h$. The opera- tion of this amplifier is likewise very simple and operationally safe. The useful voltage which can be tapped off on the resistance $R_R$, is rectified by means of a diode $D_1$ and stands as rectified half-shaft above the useful resistance $R_{Th}$ for the control of the following transistor $T_1$. The resistance $R_{Th}$ is a temperature compensated controllable resistance. The double condenser $C_K$ serves the smoothing of the rectifier voltage on the resistance $R_{Th}$. The diode $D_2$ and the resistance $R_1$ jointly with the parallel condenser $C_1$ are the structure elements known in transistor amplifying circuits.

A particularity for the present amplifying means is presented by the diode $D_3$. By the rectifying effect of this diode $D_3$, which transmits only above a predetermined minimum voltage, the switching characteristic of the transistor $T_1$ is improved, so that in case of a variation of the useful voltage on the resistance $R_R$, a slow cut-out is avoided, and a sudden cut-in and cut-out of the thyristor $T_h$ is obtained. The thyristor $T_h$ is thus suddenly cut in and cut out by means of the protection resistance $R_S$.

The thyristor $T_h$ is disposed in the center branch of a bridge formed of rectifiers in a circuit V, which is opened or closed by the thyristor $T_h$ either for the connected alternating current control circuit, so that the full alternating voltage of 220 v. is either cut-in or cut-out. This alternating voltage serves directly for the control of the relay coil of the motor relay and switches off the motor.

Since the alternating voltage originating from the generator $L_G$ is supposed to serve only for the cut-out of the motor in case of overloading, it is necessary, during the switching-on and racing of the motor, to replace this alternating voltage by another voltage until the motor, after its starting time period, has reached the desired number of revolutions. Only after this time period the alternating voltage originating from the generator $L_G$ assumes its control function.

Since it is not suitable for a practical operation during the racing of the motor to hold the thyristor $T_h$ by means of an electric contact by hand as long in the switched-on state, until the motor has reached the desired number of revolutions, the additional circuit IV, shown in the drawing, is provided, which serves the purpose of bridging over the starting time period of the motor by a foreign voltage, which renders the thyristor conducting during this time period.

If the pushbutton D is operated once, then the resistances $R_V$ and $R_5$ are subjected to the voltage and transmit the voltage to the thyristor $T_h$ by means of a transistor $T_2$ disposed in this circuit over the resistance $R_3$, so that the motor can race. The condensers disposed parallel to the resistances $R_V$ and $R_5$ discharge themselves, after the pushbutton D is released, in accordance with their time constants, and render thereby the circuit IV, serving a starting retardation, ineffective. After this voltage at the condensers parallel to $R_V$ and $R_5$ is toned down and prior to the locking of the transistor, the generator $L_G$ must have assumed the feeding of the switch-transistor $T_h$ and the motor can continue its operation. The resistance $R_V$ is controllable and permits with the condenser disposed parallel thereto, a setting of the desired retarding time period, which can be adjusted to the slow start of a motor.

After the motor has reached its high number of revolutions and the generator $L_G$ has released its energy for the thyristor, the cut-out moment of the motor is determined, as is apparent in FIG. 3, by the reaching of the minimum voltage $U_{ab}$. This lower voltage limit $U_{ab}$, at which point the switching circuit III opens the thyristor $T_h$, is set and fixed by the resistance $R_{Th}$ and determines thereby the sensitivity of the amplifying step or circuit III, and has to be set once only, after the entire switching device has become effective.

The setting of the cut-out moment dependent upon the load and thereby upon the number of revolutions of the motor, is set by tapping of the resonance resistance $R_R$. The higher the voltage tapping is set, the more can the number of revolutions and thereby the frequency be lowered, before the cut-out moment $U_{ab}$ is reached. This tapping can thus be gauged directly in form of number of revolutions or of torque, and is easily settable from the outside.

Due to the comparatively high frequency, due to the wave formation of the thin iron sheet, which frequency can be about 2000 Hz., the capacity of the connecting cable between the circuits I and II, plays, as experiments have shown, no role which would vary the cut-out time point.

It should also be mentioned, that the direct current feed of the two circuits III and IV can be performed by means of rectifiers in known circuits directly from the net. The spatially very small structure of the circuits II, III, IV and V makes its possible, in addition, to arrange these four parts, in case it is desired, directly on the motor housing, in order to feed the direct current supply from the motor terminals. It is as already mentioned before, however also that it is possible to provide the circuits II to V in the switch boxes by means of a longer connecting cable, in which switch boxes also the relay control is contained.

The circuits II and/or IV can, furthermore, be separated from the circuits III and V directly on or in the motor, or as a remote control member for the overloading likewise on a switch disk or adjacent the switch relays.

In this connection the fact should not be omitted that for an expert performing the installation in this arrangement of the present invention, it does not make any difference, if the two terminals connected with the generator coil, or the output terminals of the electrical cut-out circuit disposed in or on the motor housing, are connected with the switching members outside of the motor, or if the terminals of the interrupted contacts 36 and 37 of the prior patent are connected with the switching relay. Thus, without difficulty an exchange of the motors, in accordance with the prior patent, and in accordance with the present invention, is possible, if for this reason merely the switching circuits II, III, IV and V are used in a compact structure. The particular advantage of the present invention becomes especially pronounced, if it is taken into consideration that this exchangeability permits simultaneously a continuous control of the desired torque output, and that in addition the fly-wheel masses, to be braked and becoming effective thereby, are reduced.

It should still be mentioned that a further reduction of the fly-wheel masses is possible such, that the hollow body 20 with the cover 21 which is rotationally symmetrical can consist, likewise, of light metal. By the corresponding formation of the bolts 34, carrying the springs 26, it is also possible to eliminate the cylindrical outer jacket of the hollow body 20.

It should also still be mentioned that it is, of course, also possible to use the cut-out device described in FIG. 2 also for the cut-out upon passing a highest permissible number of revolutions, in order, for instance, to prevent the racing of the main current motor. In this case, in accordance with the resonance curve, shown in FIG. 3, the cut-out moment of the motor is determined by the voltage limit $U_{ab}$, which is disposed above the resonance frequency as a mirror image on the resonance curve in accordance with FIG. 3, thus at about 1900 r.p.m.

We claim:
1. An electric motor with pre-selectable number of revolutions and switchable in two directions of rotation, comprising
    a stator including a stator-winding,
    a motor shaft,
    a rotor formed as a slider and mounted on said motor shaft, as well as including an overload cut-out means,
    a motor housing receiving said stator and said rotor, said overload cut-out means comprising an overload coupling operatively connected with said rotor and said motor shaft, respectively, so that said overload coupling transmits the motor torque from said rotor to said motor shaft, said motor shaft comprises two shafts disposed co-axially relative to each other and one of said two shafts being hollow and receiving the other of said two shafts, to constitute the output shaft and carrying said rotor, said hollow one of said shafts and said other of said shafts being formed for a part of their length as a threaded spindle and a threaded spindle nut, respectively, engaging each other, said overload coupling comprising a disk-shaped body sitting rigidly on said hollow one of said two shafts and having about its periphery a plurality of equally divided axial bores, a second cylindrical housing receiving said overload coupling and having a closing cover including axial bores, pressure bearings securing said disk-shaped body axially immovably on said likewise axially secured other of said shafts, needle bearings supporting said second cylindrical housing on said hollow one of said two shafts, buffer springs disposed on opposite sides of said disk-shaped body and supporting the latter, a plurality of bolts extending through said axial bores of said disk-shaped body through said second cylindrical housing and through said closing cover, in order to hold together said second cylindrical housing with said closing cover, a second disk axially immovably secured to said other of said two shafts, a sheet metal ring disposed about the periphery of said second disk and said ring having an undulating outer periphery, a pole shoe of soft metal pointing toward said undulating outer periphery of said ring, an induction coil disposed about said pole shoe and disposed radially at a short distance from said sheet metal ring, a magnet magnetized in longitudinal direction and supporting said pole shoe, securing means rigidly secured in said motor housing and retaining said magnet, said pole shoe and said coil adjustably in operative position therein.

2. The electric motor, as set forth in claim 1, which includes
means for emitting a cut-out signal for said motor with the response of said overload coupling simultaneously in response to electrical signals generated in said induction coil by said sheet metal ring rotating in the magnetic field of said coil.

3. The electric motor, as set forth in claim 1, further comprising
an electric resonant circuit operatively connected to said induction coil, the resonance frequency of which is tuned to the frequency induced in said coil by said waved sheet-metal ring, and
said resonant circuit including a resonance resistance having a controllable tapping, on which a created adjustable resonance voltage can be tapped.

4. The electric motor, as set forth in claim 3, wherein said electric resonant circuit is disposed adjacent said motor housing.

5. The electric motor as set forth in claim 4, which includes
a thyristor,
an amplifier connected between said thyristor and said resonance resistance for feeding said adjustable resonance voltage to said thyristor,
a motor relay including a holding coil operatively connected to said thyristor, and
said thyristor switches off said holding coil of said motor relay after falling below the set net voltage value and thereby bringing said motor to a standstill.

6. The electric motor, as set forth in claim 5, wherein said amplifier controlling said thyristor comprises a transistor,
a rectifier operatively disposed in front of the emitter of said transistor, and
said rectifier is rendered conducting only at a predetermined minimum voltage and causes by means of said transistor an immediate cut-out of said thyristor.

7. The electric motor, as set forth in claim 6, which includes
a retarding member means operatively connected to said thyristor and comprising an adjustable resistance with a parallel disposed condenser,
a second transistor serving as a switch operatively connected to said retarding member means, and said retarding member means for holding said thyristor in operation during starting periods of said motor.

8. The electric motor, as set forth in claim 2, which includes
motor terminals, and wherein said cut-out signal means is disposed adjacent said motor housing and receives feed voltage from said motor terminals and has corresponding output terminals adapted to be substituted for mechanical cut-out contacts.

9. The electric motor, as set forth in claim 7, wherein said retarding member means is disposed adjacent said motor housing.

10. The electric motor, as set forth in claim 7, further comprising
a control disk, and
said retarding member means is disposed on said control disk.

References Cited
UNITED STATES PATENTS

| | | | |
|---|---|---|---|
| 3,165,656 | 1/1965 | Korthaus | 310—76 |
| 3,309,597 | 3/1967 | Gabor | 318—461 |
| 3,332,007 | 7/1967 | Livengood | 318—447 |
| 3,365,614 | 1/1968 | Luongo | 318—461 |
| 3,389,321 | 6/1968 | Miller | 318—463 |

ORIS L. RADER, Primary Examiner

T. LANGER, Assistant Examiner

U.S. Cl. X.R.

310—76; 318—465, 475